May 13, 1958 J. D. McCOLLOUGH 2,834,605
WHEELED VEHICLE WITH DIFFERENTIAL STEERING MECHANISM
Filed Nov. 27, 1953 8 Sheets-Sheet 1

INVENTOR.
JOHN D. McCOLLOUGH
BY George R. Bliss
Attorney

May 13, 1958 J. D. McCOLLOUGH 2,834,605
WHEELED VEHICLE WITH DIFFERENTIAL STEERING MECHANISM
Filed Nov. 27, 1953 8 Sheets-Sheet 3

INVENTOR.
JOHN D. McCOLLOUGH
BY George R. Bliss
Attorney

May 13, 1958 J. D. McCOLLOUGH 2,834,605
WHEELED VEHICLE WITH DIFFERENTIAL STEERING MECHANISM
Filed Nov. 27, 1953 8 Sheets-Sheet 4

INVENTOR.
JOHN D. McCOLLOUGH
BY George R. Bliss
Attorney

| y | TAN y | $m=\frac{20}{TAN y}$ | $n=m+26.5=\frac{20}{TAN y/2D}$ | $TAN \pi=\frac{20}{n}$ | $\pi$ | $\pi$ IN DECIMALS | ROTATION DIFF. |
|---|---|---|---|---|---|---|---|
| 1 | .0174 | 1149 | 1175.500 | .01701 | 1° | 1.000 | 0 |
| 5 | .0875 | 228 | 254.500 | .0787 | 4°30' | 4.500 | .50 |
| 10 | .1763 | 113 | 139.500 | .1434 | 8°10' | 8.166 | 1.834 |
| 15 | .2679 | 74.65 | 101.150 | .1987 | 11°15' | 11.250 | 3.750 |
| 20 | .3640 | 54.94 | 81.440 | .2455 | 13°48' | 13.800 | 6.200 |
| 25 | .4663 | 42.89 | 69.390 | .2882 | 16°5' | 16.083 | 8.917 |
| 30 | .5773 | 34.64 | 61.140 | .3271 | 18°7' | 18.110 | 11.890 |
| 35 | .7002 | 28.56 | 55.060 | .3632 | 19°58' | 19.960 | 15.040 |
| 40 | .8391 | 23.835 | 50.330 | .3974 | 21°40' | 21.660 | 18.340 |
| 45 | 1.000 | 20.000 | 46.500 | .4301 | 23°17' | 23.280 | 21.720 |
| 50 | 1.1917 | 16.780 | 43.280 | .4621 | 24°48' | 24.800 | 25.200 |
| 55 | 1.4281 | 14.000 | 40.500 | .4938 | 26°17' | 26.280 | 28.720 |
| 60 | 1.7320 | 11.540 | 38.040 | .5257 | 27°44' | 27.730 | 32.270 |
| 65 | 2.1445 | 9.326 | 35.820 | .5583 | 29°10' | 29.166 | 35.834 |
| 70 | 2.7475 | 7.279 | 33.800 | .5917 | 30°37' | 30.616 | 39.384 |
| 75 | 3.7320 | 5.359 | 31.860 | .6277 | 32°7' | 32.116 | 42.884 |
| 80 | 5.6713 | 3.526 | 30.030 | .6660 | 33°40' | 33.666 | 46.334 |
| 85 | 11.430 | 1.749 | 28.250 | .7079 | 35°17' | 35.283 | 49.717 |
| 90 | $\phi=y-90$ | $z=20 tan \phi$ | 26.500 | .7547 | 37°3' | 37.050 | 52.950 |
| 95 | 5 | 1.750 | 24.750 | .8080 | 38°57' | 38.944 | 56.056 |
| 100 | 10 | 3.526 | 22.974 | .8720 | 41°6' | 41.100 | 58.900 |
| 105 | 15 | 5.358 | 21.142 | .9470 | 43°27' | 43.450 | 61.550 |
| 110 | 20 | 7.280 | 19.220 | 1.0400 | 46°8' | 46.130 | 63.870 |
| 115 | 25 | 9.326 | 17.174 | 1.1650 | 49°22' | 49.370 | 65.630 |
| 120 | 30 | 11.546 | 14.954 | 1.3380 | 53°14' | 53.230 | 66.770 |
| 123.520 | 33.52 | 13.250 | 13.250 | 1.5090 | 56°29' | 56.480 | 67.040 |

INVENTOR.
JOHN D. McCOLLOUGH
BY George R. Bliss
Attorney

May 13, 1958　　　J. D. McCOLLOUGH　　　2,834,605
WHEELED VEHICLE WITH DIFFERENTIAL STEERING MECHANISM
Filed Nov. 27, 1953　　　　　　　　　　　　　　8 Sheets-Sheet 8

INVENTOR.
JOHN D. McCULLOUGH
BY George R Bliss
Attorney

United States Patent Office 2,834,605
Patented May 13, 1958

2,834,605

WHEELED VEHICLE WITH DIFFERENTIAL STEERING MECHANISM

John D. McCollough, Los Angeles, Calif., assignor of one-half to Alan E. Grimley, Glendale, Calif.

Application November 27, 1953, Serial No. 394,705

16 Claims. (Cl. 280—91)

This invention relates to means for steering the wheels of a dolly or truck and deals more particularly with such means incorporated in a dolly on which is mounted a motion picture or television camera.

In photographing motion picture and television scenes, many desired effects are obtained by mounting the camera for movement relative to the subject or scene being photographed. The flexibility of movement of the camera, of course, allows for a great variety of such effects, but such movement must be accomplished smoothly and without jar.

An object of the present invention, therefore, is to provide a dolly, for the more particular purpose of mounting a motion picture or television camera, which is supported on wheels and embodying means whereby said wheels may, selectively, be steered to provide for those movements of the dolly which give it the desired maneuverability.

Another object of the invention is to provide a dolly, as indicated, in which the wheels thereof can be directed for translative movement of the dolly in any chosen direction in a straight line without rotation of the dolly and camera with reference to the studio.

Another object of the invention is to provide a dolly in which the wheels thereof can be steered for movement of the dolly in an arcuate path around a point which is preferably symmetrically related to the group of wheels and is usually outside of the plan figure cornering on the wheels.

A further object of the invention is to provide a dolly in which the wheels thereof can be steered for circular movement of the dolly about a point within or at the center of this plan figure.

A still further object of the invention is to provide the wheels of a dolly with novel transmission means whereby said wheels may, selectively, be steered to positions which are tangential to arcs generated about a point outside of the wheels, or to positions tangent to a circle generated about a point inside of or central of the wheels whereby universal movement of the dolly is obtained.

A still further object of the invention is to provide a novel and improved transmission whereby the wheels on one side of a dolly are positioned tangent to an arc generated about a point outside said wheels and the wheels on the other side of the dolly are positioned tangent to a greater or smaller arc also generated about said point, whereby the dolly is adapted to track on its wheels smoothly and without side skid of any wheel.

My invention also has for its object to provide such means that are positive in operation, convenient in use, easily installed in a working position and easily disconnected therefrom, economical of manufacture, relatively simple, and of general superiority and serviceability.

Another object is to provide a novel and improved transmission comprising certain elements which in one relative position with respect to each other transmit movements of the steering shaft of the vehicle to angle all of the wheels of the vehicle from an initial normal position of parallelism through equal arcs at the same rotational rate, and which when shifted to another relative position with respect to each other at the option of the operator and without the addition of other transmission elements or the omission of any of said certain elements, transmit movements of the steering shaft to angle the wheels from an initial normal position of parallelism at differential rotational rates and to angular positions of respectively different degrees.

It is also an object of the invention to provide for a motion transmitting mechanism which will angle objects characterized by laterally extending surfaces, at a relatively different rate, from initial positions in which these surfaces are parallel to new positions in which axes, perpendicularly intersecting these surfaces, intersect each other at a point which progresses along a locus line having a direction perpendicular to the surfaces in their initial position.

The invention also comprises novel details of construction and novel combinations and arrangements of parts, which will more fully appear in the course of the following description. However, the drawings show and the following description describes one embodiment only of the present invention, which is given by way of illustration or example.

The vehicle comprises a platform 1, rear right and left wheels 3 and 2, respectively, front, right and left wheels 5 and 4, respectively, which support the platform. Each of the wheels rotates on a horizontal axle 7 mounted between the forks of a bracket 6 extending downward from a spindle 8 which is swivel-mounted on a vertical axis on the underside of the platform 1. The four wheels thus serve as casters for the platform.

Each of the four caster wheels is connected by sprockets and sprocket chains to a transmission control 14 (see Figs. 3, 4 and 5) mounted on and within a transmission casing 13 (see also Figs. 1 and 2) mounted preferably at the rear end of the platform 1 and on the central longitudinal axis thereof. The casing or housing 13 has an upper shell 15 and lower shell 16 suitably secured to the upper shell. The upper shell is secured to the platform 1 in any appropriate fashion as by a plurality of bolts 43 threaded into the shell 15 at their lower ends and clamped to the platform at their upper ends by nuts 45 and spacing ferrules 44.

The swivel spindle 8 of the wheel 3 has fixedly mounted thereon a sprocket wheel 10 which is connected to a sprocket wheel 24 on a vertical shaft 18 mounted in the control housing 13 by a sprocket chain 28. Sprocket wheels 9, 12 and 11, similarly mounted on the spindles 8 of the other three wheels, are connected by means of sprocket chains 27, 29 and 30 respectively to sprocket wheels 23, 25 and 26 which are keyed or otherwise fixedly secured to the vertical shafts 17, 19 and 20 which, like the vertical shaft 18 are mounted by means of ball bearings 21 in bosses 22 formed in the upper and lower shells 15 and 16, respectively, of the control housing 13. Suitable idler sprockets 125 are mounted appropriately on the undersurface of the platform 1 to guide the sprocket chains in their travel and to maintain proper tension therein. Their positions may be adjusted to permit adjustment of the angular positions of the driving and driven sprocket wheels relative to each other, to attain angular registry at their initial normal positions.

The shaft 17 is connected to drive the shaft 19, which is just in front of the shaft 17 and on the same side of the vehicle, by means of a bevel gear 31 pinned to the shaft 17 (see Fig. 5) and of a bevel gear 34 which meshes with the bevel gear 31 and is pinned to the cross shaft 32 mounted in bearings 33 in a boss 15a on the upper housing shell 15, and further by means of a bevel gear 35 also pinned to the shaft 32, and the bevel gear 36 which meshes with the bevel gear 35 and is pinned to the shaft 19. If now the shaft 17 and sprocket wheel 23 turn in a clockwise direction, it is apparent that the shaft 19 will be turned in a counterclockwise direction. This counterclockwise rotation of the shaft 19 will be imparted to the sprocket wheel 25 in the following manner.

The sprocket wheel 25 is mounted for rotation on a boss 22, and a ball bearing 41 disposed between the ring 42 and the hub 40 of the sprocket wheel 25. A ring 39 is bolted to the hub 40 of the sprocket wheel 25. The shaft 19 is free to move over a short vertical range relative to the horizontally stationary ring 39 and is rotatively secured to the ring 39 by means of splines 38. The sprocket wheel 25, then, while held at a constant horizontal level with respect to the casing 13 rotates in the same direction as the shaft 19.

Figure 5:
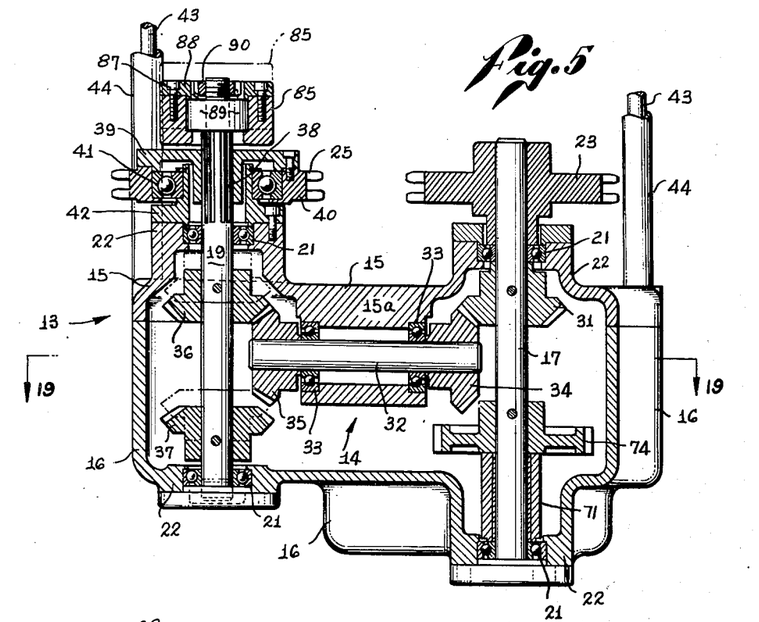
Fig. 5 is a vertical sectional view taken along the line 5—5 of Figure 4, with the elevational showing of the structure to the rear of the section plane, omitted for clarity.

This shaft, by a means to be presently described, may be shifted vertically from the position shown in full lines in Fig. 5 to the position shown in dot-dash lines in Fig. 5. When the shaft 19 is in the latter or upper of these two positions, the bevel gear 35 is disconnected from the bevel gear 36 and meshes with a lower bevel gear 37 also pinned to the shaft 19 and which is therefore elevated into contact with the bevel gear 35. With this latter adjustment of the shaft 19, a rotation of the shaft 17 imparts a rotation in the same direction to the shaft 19.

The shafts 18 and 20 are similarly connected by a similar arrangement of bevel gears on the other side of the transmission.

Figure 1:
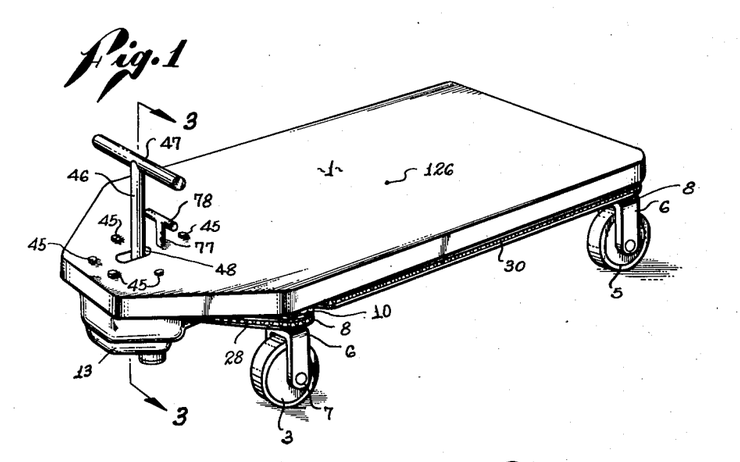
Fig. 1 is a perspective view of a steerable wheeled vehicle embodying the invention.

Since the differential transmission is located at the rear of the vehicle, and the operator stands back of it or at a side of it in position for pushing or pulling the vehicle, parts beyond the longitudinal centerline of the vehicle as seen in Fig. 1 will be designated with the word "left" and those on the near side of the vehicle will be designated by the word "right," these words being used with reference to the operator as he looks forwardly from his station. The words "rear" and "front" and "rearwardly" and "forwardly" will be similarly used to designate objects to the rear of the central transverse axis of the vehicle and those in front thereof, respectively, the end of the vehicle adjacent the differential transmission being considered as the rear end of the vehicle and the other end the front end of the vehicle.

It has been shown above how the rear right sprocket wheel 24 and the front right sprocket wheel 26 are tied together for rotation either in the same direction or in opposite rotational directions depending upon whether the drive shaft 19 is in its upper or lower position of adjustment respectively. The rear left sprocket wheel 23 and the front left sprocket wheel 25 may be similarly connected for rotation in the same or opposite directions by shifting vertically the right drive shaft 20. The two shafts 19 and 20 are shifted in unison by the following means.

A yoke 82 with its hub 82a sleeved upon a vertically movable shifting rod 77 is formed with two laterally extending arms 83 and 84 which each carry at their outer ends, and integrally formed therewith, bosses 85 and 86 respectively. An upper bearing retainer ring 88 is bolted to the top of each of these bosses 85 and 86 by means of bolts 87. These bosses and retaining rings are shaped and shouldered to hold between them in a fixed vertical position a ball bearing 89 in which rotates one of the drive shafts 19, 20. A nut and lock washer 90 on the upper end of the drive shaft cooperating with a shoulder just beneath the ball bearing 89 holds the bearing in vertical fixed position upon the drive shaft. This construction provides for the simultaneous elevation or lowering of the drive shafts, at the same time permitting rotation of the two shafts in either direction and in either of their two vertical positions of adjustment and the transmitting of this rotary motion to the sprocket wheels 25 and 26 which are vertically stationary with respect to the transmission housing.

The shifting rod 77 may be rotated through a small angle with respect to the yoke hub 82a while remaining vertically stationary with respect to the yoke hub. Rings 80 and 81 pinned to the rod 77 above and below the yoke hub, respectively, impart a vertical shifting movement of the rod 77 to the yoke 82. The shifting rod 77 is journalled in a boss 92 and a boss 91 of the upper and lower housing shells 15 and 16 respectively to permit this small vertical movement and also to permit its rotation over a small angle. The rod 77 is vertically shifted and angularly rotated by means of a handle 78 at its upper end. This handle projects through the platform floor and is within reach of the operator of the vehicle. (See Fig. 1.)

Figure 3:
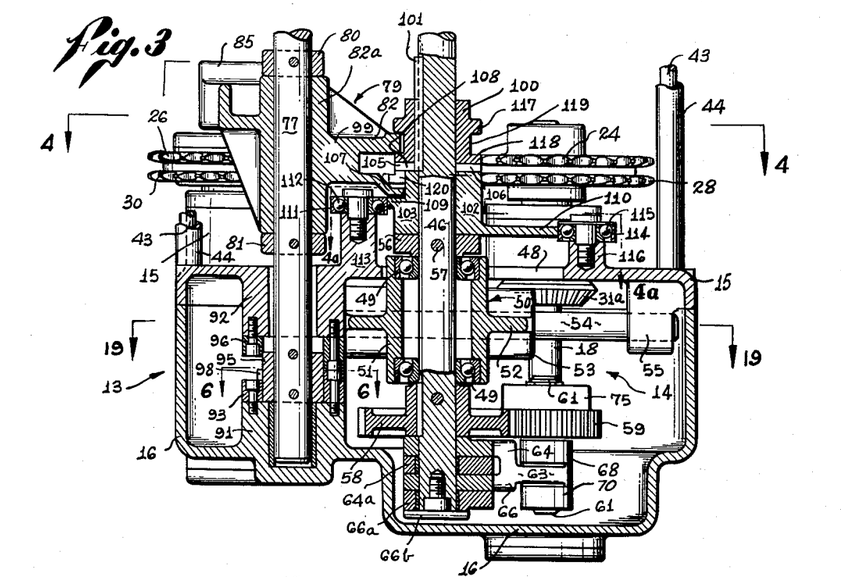
Fig. 3 is a vertical sectional view of the steering transmission taken along the line 3—3 of Fig. 1 and the line 3—3 of Fig. 4.

An elongated collar 95 is rigidly secured to the lower portion of the shaft 77 as may be seen in Fig. 3 and has formed thereon a lobe 98 having an arcuate length of 90°.

Figures 6, 7, 8:
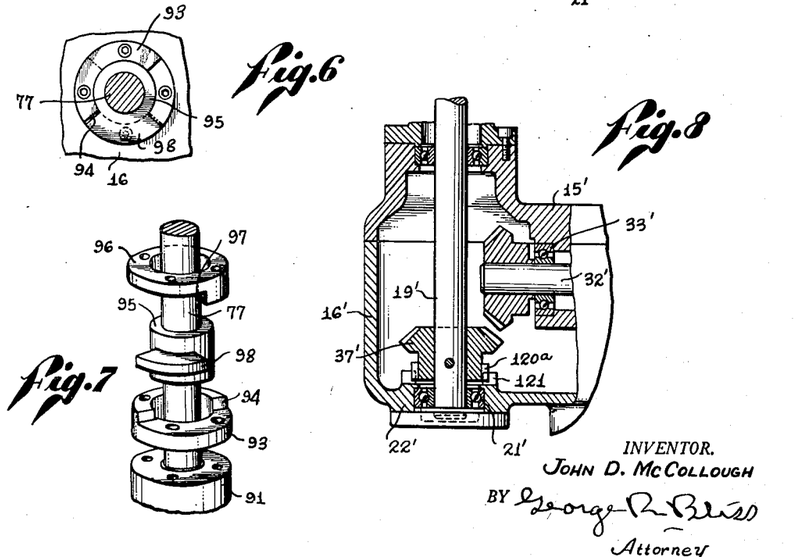
Fig. 6 is a horizontal sectional view taken along the line 6—6 of Fig. 3.
Fig. 7 is a fragmentary exploded perspective view of the shaft 77 and locking rings and locking collar which appear in Fig. 6.
Fig. 8 is a fragmentary vertical sectional view of an alternative embodiment of the invention corresponding to the lower lefthand portion of the sectional view shown in Fig. 5.

As will be seen from an inspection of Fig. 7, when the adjusting rod 77 is in its lower position, this lobe 98 is seated in an arcuately formed cutout notch 94 extending 180° around a lower locking ring 93 which is screwed to the boss 91 and which is bored to provide a clearance bore for collar 95. An upper locking ring 96, screwed to the boss 92, with a similar arcuate cutout notch 97 of 180°, encircles the shifting rod 77 above the locking collar 95 with its cutout notch 97 arcuately displaced 90° from the cutout notch 94 of the lower ring. If now the lobe 98 is seated at one end of the notch 94 and that end of the notch 94 is out of vertical registry with the notch 97, the rod 77 is locked against vertical movement upward in its lower position. By giving the rod 77 a 90° turn by means of the handle 78 at its upper end, and then lifting the rod 77 until the lobe 98 enters one end of the cutout notch 97 in the upper ring, and then shifting the shaft an additional quarter turn in the same direction, the lobe 98 moves to the other end of the notch 97 locking the shifting rod 77 in its upper position. As will later appear it is necessary that the shifting rod 77 be locked against vertical movement, in either of its positions of adjustment. Contact of the lobe 98 with the exposed surfaces of the notches in the locking rings 93 and 96 respectively determines the range of vertical movement of the shifting rod 77.

It is apparent that the turning of all four supporting wheels of the platform upon their caster spindles, is controlled and angularly related by the turning of the sprocket wheels 23, 24, 25 and 26 and the four shafts 17, 18, 19 and 20 upon which they are either pinned or splined. The rotation of the rear shafts 17 and 18 and the respectively equal angular rotation of the shafts 19 and 20 is effected by the rotation of the steering shaft or column 46 through manipulation of the cross handle 47 at its upper end by the following structure.

The shaft 46 is rotatably supported on a block 50 by ball bearings 49. The block 50 has a vertical cylindrical tubular portion 51 and an integrally formed horizontal web 52. Upon one side of this web is integrally formed a cylindrical boss 53 having a central bore provided at each end with a bearing bushing, and a shorter boss 53a with a similar parallel bore and bushing. These bushings engage parallel slide rods 54 respectively. By means of the block 50, the shaft 46 which it supports may be given a movement longitudinally of the vehicle on the slide rods 54, suitably mounted at their rear ends in a pair of bosses 55 depending from the upper shell 15 and at their front ends in the bosses 92 depending also from the upper shell 15 of the transmission housing.

Figure 4:
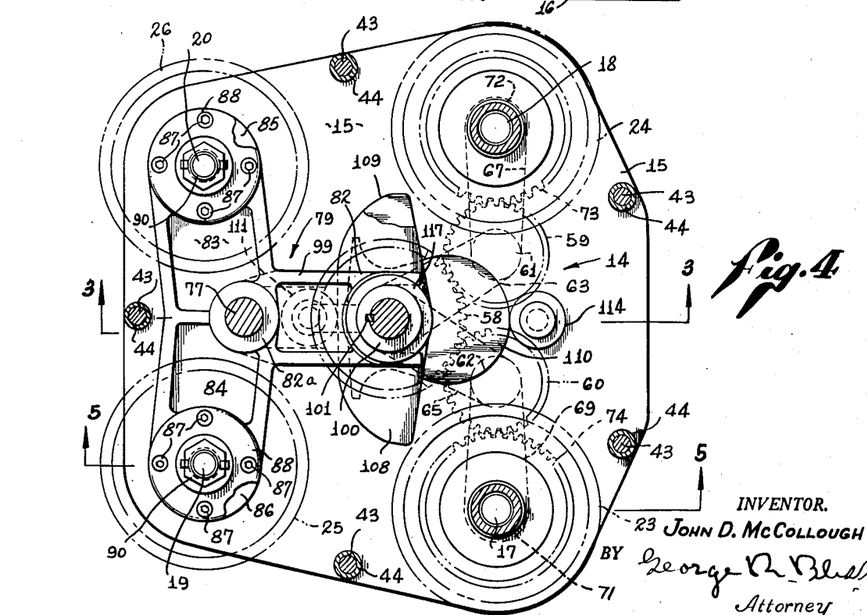
Fig. 4 is a horizontal sectional view of the transmission taken along the line 4—4 of Fig. 3 with the sprocket chains removed and the chain drive sprockets drawn in phantom for clarity.
Figure 4A:
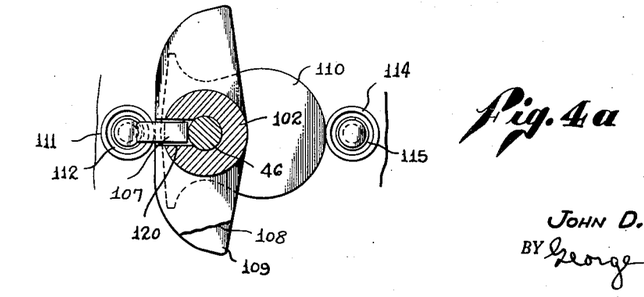
Fig. 4a is a sectional view taken along the line 4a—4a of Fig. 3.
Figure 19:
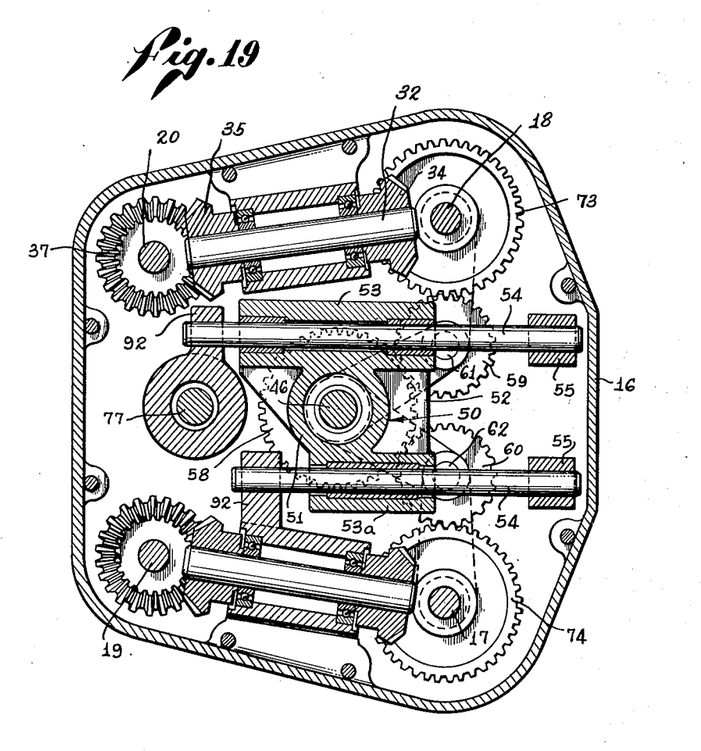
Fig. 19 is a horizontal sectional view taken along the line 19—19 of Figs. 3 and 5.

When it is desired to turn all four of the supporting wheels of the vehicle in the same direction of rotation through equal angles of movement, this shaft 46 is locked in its forwardmost position, (the position shown in Figs. 3 and 4) in a manner to be presently described. Steering rotation of the shaft 46 is imparted to the shafts 18 and 17 by a double train of spur gears as best shown in Figs. 4 and 19. A spur gear 58 is pinned to the lower end of the shaft 46. The shaft 46 is held vertically stationary by means of a collar 56 secured to the shaft by a pin 57, this collar 56 resting upon the upper ball bearing 49. The spur gear 58 meshes with two symmetrically mounted spur gears 59 and 60 which are pinned to and rotate on two stub shafts respectively 61 and 62. These stub shafts are supported in bores in the outer ends of links 63 and 65, respectively, the inner ends of which have upper and lower vertical forks 64 which are seated upon the shaft 46, the fork arms of link 63 being staggered vertically upon the shaft 46 relative to the forks 64a and 66a of link 65. A supporting cap 66b is bolted to the lower end of the shaft 46 for holding the forks of the links in position vertically.

Stub shafts 61 and 62 are also linked to the shafts 17 and 18 by links 67 and 69. Each of links 67 and 69 at one end is forked (as for example link 67 at 68 and 70, see Figure 3) to embrace the stub shafts 61 and 62 respectively and at their other ends are provided with hubs 71 and 72 which encircle the shafts 17 and 18 (see Figures 4, 5, and 19).

The spur gear 59 meshes not only with the spur gear 58 of the shaft 46 but also meshes with the spur gear 73 keyed to the shaft 18. Similarly the spur gear 60 meshes with the spur gear 74 on the shaft 17. With the shaft 46 locked in its longitudinally forwardmost position as shown in Figs. 3 and 4, the shifting rod 77 is also locked in its uppermost position by an interlocking mechanism which is later described.

Assuming now that the steering post handle 47 is turned in a clockwise direction, shaft 46 and spur gear 58 will likewise be turned in a clockwise direction, spur gears 59 and 60 will turn in an anticlockwise direction, the spur gears 73 and 74 with their shafts 17 and 18 and the sprocket wheels 23 and 24 at the upper ends of these shafts will all be turned in a clockwise direction. Through the system of bevel gears, best shown in Fig. 5, the two bevel gears 37 at the lower ends of shafts 19 and 20 will likewise be turned in a clockwise direction. The shafts 19 and 20 and the sprockets 25 and 26 will be rotated in the same direction.

Figure 2:
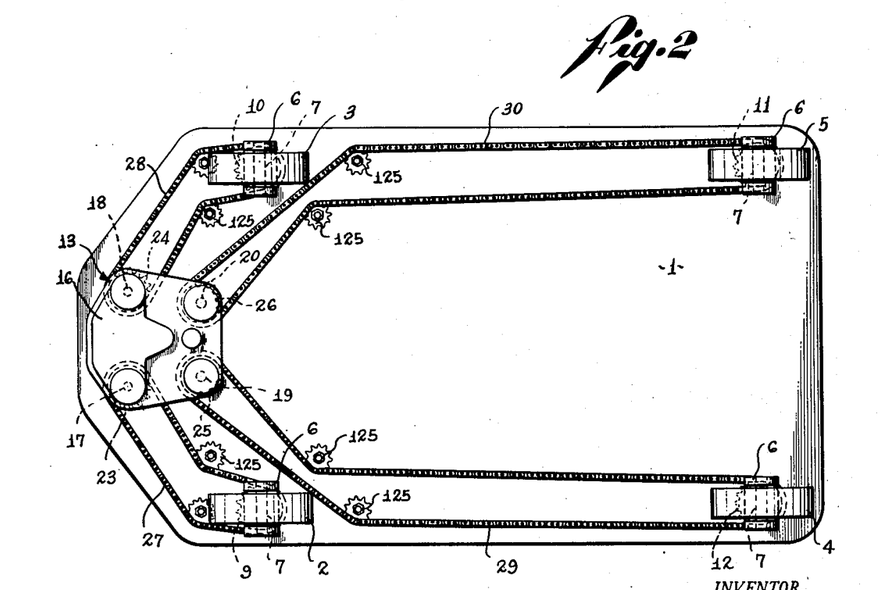
Fig. 2 is a bottom plan view of the vehicle.

By means of the sprocket chains shown in Fig. 2, the four wheels will all therefore turn in the same clockwise direction on their spindles and at the same angular rate so that for any position of the steering handle 47, these four wheels will each assume a position of corresponding and equal angular deviation from the normal. In this manner the vehicle may be caused to have a motion of rectilinear translation in any desired direction, the direction being determined by the position of the steering handle 47. If the steering handle 47 is slowly turned, the vehicle will move translatively in a curvilinear path, the center of which is determined by the rate of turning of the handle 47; but in any event, no matter how the handle 47 is manipulated, the vehicle itself as a whole will have a movement of translation with respect to the floor over which it travels, and the angle made by its horizontal or transverse or any other axis with the floor, will remain constant in value.

For differential steering movement between the left and right front wheels and left and right rear wheels, provision is made for an automatic horizontal bodily movement of the steering shaft 46 rearwardly along the longitudinal axis of the vehicle concurrently with and in correlation with the rotation of the steering shaft 46 when this rotation is effected by manipulation of the steering handle 47. The mechanism is so designed that when the shaft has reached its rearmost position it has been turned through an angle of 90° from its initial normal position for straight line movement of the vehicle parallel to its longitudinal axis.

Figures 9, 10, 11, 12, 13:
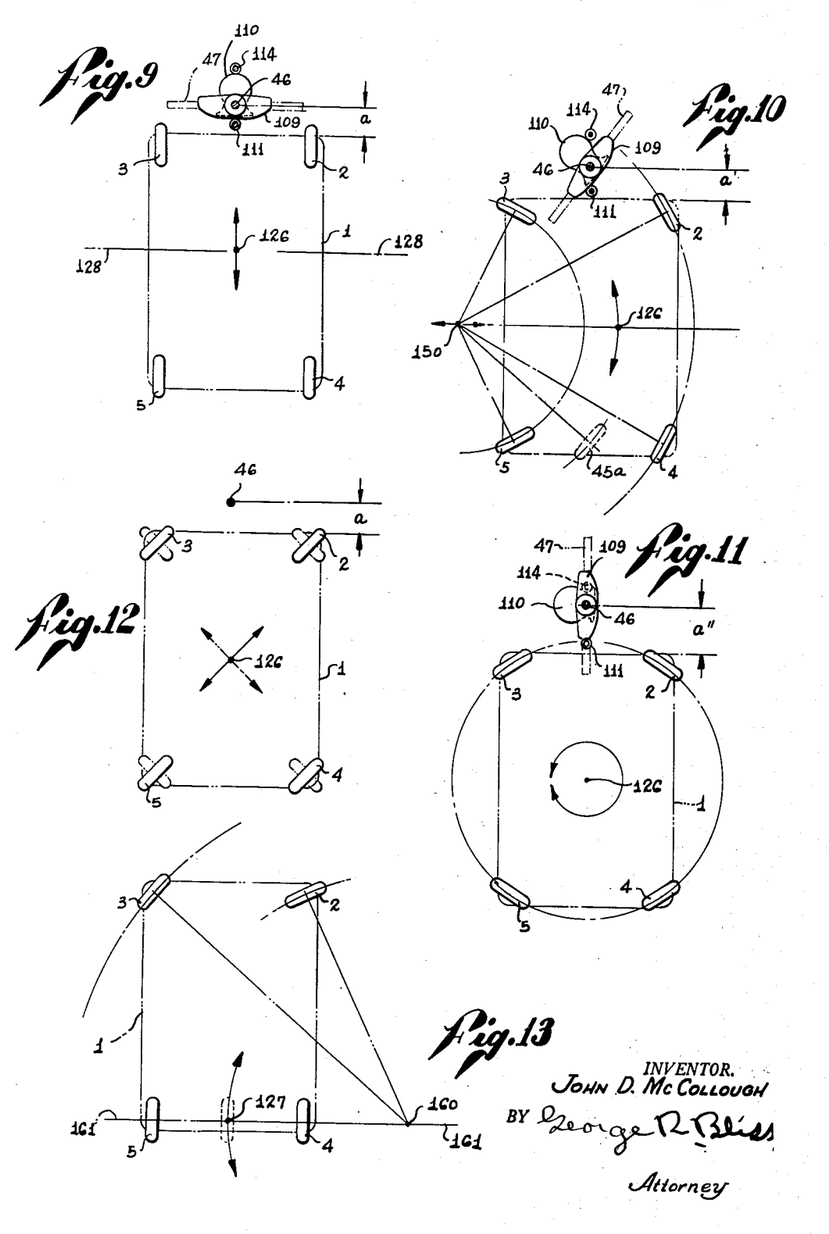
Fig. 9 is a diagrammatic plan view of the vehicle with the steering post handle, its associated cam, and the wheels shown in the initial position for either a differential steering of the left and right wheels of each of the forward and rear pairs of wheels, or for a translative movement of the vehicle with all wheels in parallelism.
Fig. 10 is a similar view showing the steering post handle, the cam, and the wheels adjusted for a differential steering of the left and right wheels of each of the forward and rear pairs of wheels for turning the vehicle about a rotational center to the left of the vehicle and on the transverse axis midway of the forward and rear wheels of the vehicle.
Fig. 11 is a similar view showing the steering post handle, the cam, and the wheels adjusted for differential drive for rotation about a center point with reference to the four wheels of the vehicle.
Fig. 12 is a similar view showing the transmission and wheels set for translative movement of the vehicle in two different directions.
Fig. 13 is another similar view in which the wheels at one end of the vehicle are adjusted for movement about a common center of steering movement on a locus line which is the transverse axis of the rear wheels. For this type of movement of the vehicle a differently designed transmission is required.

In its initial position along the longitudinal axis of the vehicle, the position which it occupies as shown in Figs. 3 and 4, at the start of a differential steering maneuver, and diagrammatically shown in Fig. 9, the angular differential of the right and left wheels is zero, and all four wheels are parallel to the longitudinal axis of the vehicle. The vehicle travels in the direction of this axis. At this juncture the center about which the vehicle may be considered to be theoretically turning is located at an infinite distance from the central point 126 of the vehicle along either extension of its transverse axis line, 128, as shown in Fig. 9.

As the shaft 46 is caused to move rearwardly by a means to be presently described, the steering rotational movement of the steering shaft 46 upon its axis is imparted, in a differential manner and to a different extent, to the two rear sprocket wheels 23 and 24 and consequently to the rear caster wheels 2 and 3 respectively. The front wheels 4 and 5 by the bevel gear drives above set forth, are given steering movements in the other direction from that of wheels 2 and 3 but at a differential angular rate which is the same as that of the differential angular rate of steering movement of the rear wheels 2 and 3 as may be seen from an inspection of Fig. 10.

When the steering shaft 46 has been moved through 90°, the wheels of the vehicle occupy the positions shown in Fig. 11 and the vehicle when turned by a properly applied force will turn about its own center 126. The horizontal movement of the shaft as a whole along the central longitudinal axis of the vehicle is so correlated with the angular turning movement of the steering shaft that this turning movement of the vehicle about a center which is moving on a locus line from infinity to the central point 126, is effected by a turning movement of the steering shaft from its initial normal position to a position 90° from its initial position in either direction of rotation. The structure by which this result is attained will now be described.

A collar 100 is splined upon the shaft 46 at 101 and is movable vertically over the same range as the vertical range of movement of the shifting rod 77 by means of an arm 99 extending rearwardly from the yoke hub 82a of the lifting yoke 82, this yoke hub 82a being, as has been previously described, sleeved upon the shifting rod 77. This arm 90 is forked at its outer end as best illustrated in Fig. 4, the two forks of the arm encircling the collar 100 and engaging a circumferential groove 119 in the collar 100. When the shifting rod 77 is in its lower position as shown in Fig. 3, the collar 100 will be held in its lower position by the shoulder 118 of this groove 119. In this position clutch jaws 105 formed on the lower end of collar 100 will engage clutch jaws 106 on a cam hub 103 of a cam 102, compelling the cam to rotate with the steering wheel. When this shifting rod 77 is raised to its upper position, it will raise the clutch collar 100 to its upper position by upward pressure on the shoulder 117, disengaging the clutch jaws 105 and 106 and permitting free rotation of the steering shaft 46 within the cam 102 which is loosely sleeved upon the shaft. When the collar 100 is in the upper position, the cam 102 is locked against rotation by a means to be presently described.

The cam 102 has a front and upper cam lobe 109 and a rear and lower cam lobe 110 extending laterally from the cam hub 103 in opposite directions and at slightly different levels and having complementary profiles. The front cam lobe 109 engages a cam follower 111 which is the outer race of a ball bearing 112 which is screw fastened to a post 113 integrally formed with and extending upwardly from the upper housing shell 15. The rear cam lobe 110 engages a cam follower 114 which is the outer race of a ball bearing 115 screw fastened to a post 116 which is an integral extension of the upper housing shell 15. Because of the complementary contours of the front and rear cam lobes, the cam travels rearwardly and forwardly as the cam rotates with restriction effected in both forward and rearward directions. When the clutch jaws 105 and 106 are engaged, it is apparent that the steering shaft 46 is caused to move rearwardly of the transmission when the steering shaft is turned.

The cam hub 103 has fixedly secured to it at a level above that of the cam lobe 109, a plate like extension 108 of the same profile as the cam lobe 109. This plate is formed with a cutaway notch 120 disposed midway between the ends of the plate. A locking finger 107 projecting from the yoke hub 82a at a level below that of the arm 99, engages the notch 120 when the shifting rod 77 is raised, locking the cam 102 against rotation with the steering shaft 46 upon which as has been said above, it is sleeved, and preventing the cam lobes 109 and 110 from causing longitudinal movement of the shaft 46 forwardly and rearwardly of the vehicle as the shaft is rotated. The plate 108 also acts as a barrier against elevation of the shift rod 77 at any other juncture than that in which the steering shaft 46 is in its forwardmost position. The clutch jaws 105 and 106 similarly act as a shift barrier when the rod 77 is raised and the handle is at other than normal position.

The following discussion pertains to the design of the profile of the two complementary cam lobes 109 and 110. Rotary movement of the shaft 46, because of the engagement of these cam lobes with their followers 111 and 114 causes the vertical axis of the shaft 46 to move rearwardly in that vertical plane which is equi-distant from the rear drive shafts 17 and 18. The shaft 46 is thus caused to move horizontally to and fro concurrently with its rotation in first one and then the other direction; so that the rotary motion of the spur gear 58 keyed to the shaft 46 may be imparted to the spur gears 73 and 74 in a differential degree due to the epicyclic movement of the intermediate spur gears 59 and 60 around the axes of the spur gears 73 and 74. The spur gears 73 and 74 rotate through arcs of the same extent as do the sprocket wheels 24 and 26 on one side of the vehicle and as do the sprocket wheels 23 and 25 on the other side of the vehicle respectively, and also as do the supporting caster wheels on the two sides of the vehicle respectively.

The differential movement must be such as to turn the vehicle about a center of rotation, which, corresponding to the steering positions of the steering handle 47, travels along a locus line from infinity on either side of the vehicle to the center of the vehicle accompanied by a perfect rolling contact of the four wheels with the floor without slipping or skidding. While a locus line along any other transverse line with respect to the vehicle might be used with a coresponding design of the steering mechanism, for practical purposes, a vehicle of this character is usually adequately maneuverable if it is capable of either one of two movements, i. e., a movement of translation with all wheels parallel to each other, or a movement in arcs of different degrees of curvature about centers on the specific locus line above described. While then, in accordance with the broad principles of the invention, any other locus line may be used in the design of the cam lobes, in the following description the design procedure will be described for that particular locus line which is the transverse axis of the vehicle through the center point 126 thereof.

Furthermore, the profile of the cam lobes for this or any other particular locus line will vary with variation of the ratio of the wheel gauge, i. e., the distance across the vehicle between the two front wheels or the two rear wheels, to the longitudinal distance from the axis of the front wheels to the axis of the rear wheels. In order to illustrate in a concrete manner the principles of the design of the cam lobe, the wheel gauge in the following computation is assumed to be 26½" and the distance between front and rear wheels is assumed to be 40".

Obviously, by reference to Fig. 10, it will be seen that for any position of the steering shaft other than its initial zero position, the inside wheels which are nearer to the center of rotation of the vehicle will have a steering angle which is greater than that of the outside wheels 2 and 4, and as the steering shaft is being rotated the inside wheels will have a steering rotation which will increase at a greater rate than that of the outside wheels. The profiles of the cam lobes must be designed to produce exactly this steering rotational differential. It will be understood that, as used herein, the word "rotation" as applied to the caster wheels means rotation about the vertical axes of their spindles, and not about the horizontal axes of their axles.

The problem then is to so design the profiles of the cam lobes that the combined rotary steering movement of the shaft 46 and its concurrent translative linear movement bodily along the longitudinal axial plane of the vehicle will result in such a differential rotative movement of the shafts 17 and 19 on the one hand and the shafts 18 and 20 on the other hand that the vehicle for any position rotatively of the steering shaft will move in the arc of a circle about a center on the locus line which is the central transverse axis of the vehicle. The first step in the procedure by which the cam lobes are designed is the ascertainment of the differential positions of right and left steering wheels resulting from the fore and aft positions of the steering shaft, as determined by the epicyclic gear and linkage arrangement which is characteristic of this invention.

Figures 14, 15:
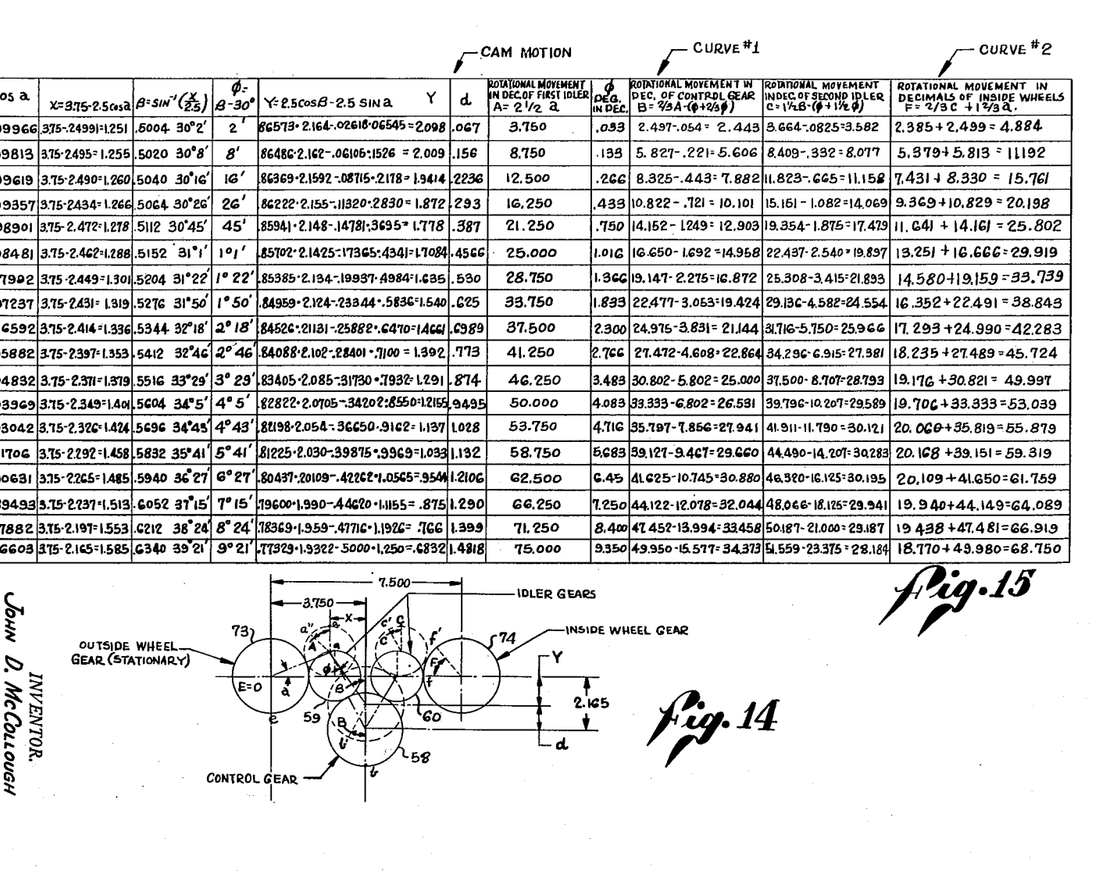
Figs. 14 to 18 inclusive show diagrams, tables, and a graph illustrating the procedure by which the profile of the control cams of the differential steering device is determined.

Reference is now made to Fig. 14 which is a diagrammatic representation of the spur gears and the linkage by which the motion of the steering shaft is imparted to drive shafts 17, 18, 19 and 20. It is obviously necessary to only represent the rear drive shafts 17 and 18 and their respective spur gears 74 and 73 on this diagram to obtain the proper indication of the movement of the caster wheels. In the diagram, the spur gear 74 is assumed to be driving the outside wheels in any particular turning movement and bears that legend on the diagram. Similarly, spur gear 73 is assumed to be driving the inside wheels and bears the legend "inside wheel." The control spur gear 58 has the same rotative and translative movement as the steering shaft 46 and bears the legend "control gear."

In computing the rotational differential between the outside and inside wheels resulting from linkage movement, the first step is to compute the difference in angular deviation of these two wheels due to the horizontal displacement of the linkage as it moves rearwardly under the thrust of the rearwardly moving shaft. It is assumed for simplicity of this computation that the outside wheel is held stationary and the control gear is translatively moved rearwardly and simultaneously rotated as it is constrained to do by the epicyclic action of the idler gears 59 and 60 when the outside wheel is held stationary and the inside wheel is free to rotate. The initial position, both rotatively and translatively, of the five gear wheels, i. e., of the control wheel, of the two idler gear wheels, and of the inside and outside wheels, is shown in full lines on the diagram. The dotted lines show the position of these control gear and idler wheels at that juncture at which the control gear has moved rearwardly a distance $d$ causing the idler gear 59 to have an epicyclic movement around the stationary outside gear wheel 73 an angular distance $\alpha$ as measured upon the face of the outside gear wheel. Since the outside gear wheel 73 and inside gear wheel 74 are translatively stationary, the full lines of the initial position conceal the dotted lines which might be used to represent the position which gear wheels 73 and 74 assumed rotatively after the translative movement of the control gear over a distance $d$. In the case of the outside wheel gear 73 the full line represents both the initial rotational position and the rotational position after this translative movement of the control gear since as has been stated above, we are assuming outside wheel gear 73 is held rotatively stationary. A point $e$ on its circumference has no arcuate movement.

This angle $\alpha$ may have any value consistent with the range of the linkage gear assembly, but as shown on the diagram it is approximately 20°. The table in Fig. 15 shows the method of mathematically and geometrically computing the rotational movement $\beta$ in degrees of the control gear over the rotatively stationary outside wheel gear 73 and the rotational movement F in degrees of the inside wheel over the stationary outside wheel for any given angle $\alpha$ on Fig. 14. For the angle 20° indicated by the arrow to the left of the table the cam motion $d$ is seen to be .9495 inch, the degrees $\beta$ of rotational movement of the control gear, as seen in the movement of $b$ on its circumference to $b'$, is 26.531 and the degrees F of movement, of the inside wheel as seen in the movement of $f$ on its circumference to $f'$, is 53.039. These angular values were computed for 18 different values of $\alpha$ and were plotted on the graph shown in Fig. 16 with the ordinants indicating units of translative movement of the steering shaft from its initial position at zero and the abscissae indicating degrees of rotation. The lefthand straight ordinant line "0" of the graph represents the rotative movement of the outside wheel which is of course zero for all translative positions of the steering shaft in accordance with the assumption upon which the computations were made. Curve 1 represents the control gear lead over the outside wheel, the values tabulated under the heading curve 1 in Fig. 15 being plotted against the linear movement values under the column cam motion of this table in Fig. 15. Similarly, curve 2 represents the inside wheel lead over the outside wheel, the values under curve 2 of the table in Fig. 15 being plotted against the distances of linear movement listed under cam motion of the table of Fig. 15.

Having thus plotted the lefthand vertical straight line 0, and the curves 1 and 2, the relative angular positions of the outside wheels, the control gear, and the inside wheels resulting from the linkage motion only, the next step is to plot curves for the relative angular positions of these three gear wheels, which obtain when the vehicle is steered about centers along a locus line of the transverse axis of the vehicle. The diagram Fig. 17, and the table of Fig. 18 illustrate how this is done.

Figure 17:
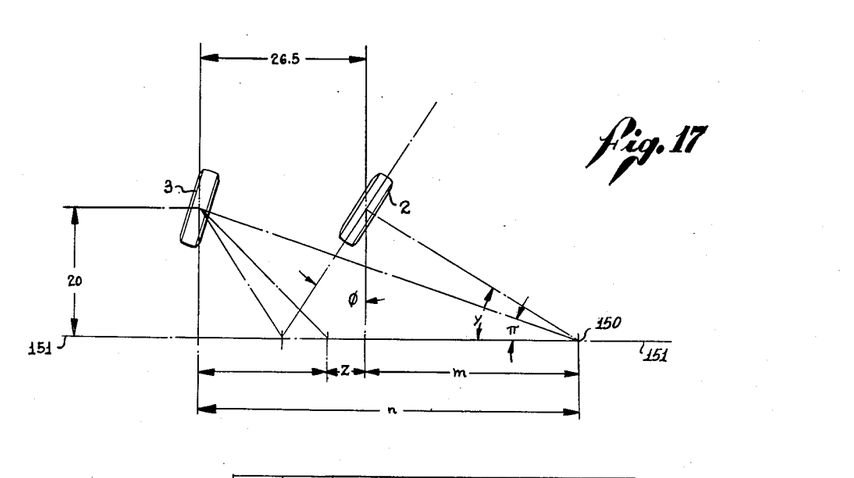

As shown in Fig. 17, the wheels 3 and 2 of the vehicle move in their respective circles about a common center 150 which may be at any point, corresponding to the angular extent of the rotation of the steering shaft 46, along the locus line 151—151. Using for example 26½″ as the value of the wheel gauge and 40″ as the distance between the axes of the front and rear wheels, table 18 illustrates how for any given angle $\gamma$ of inside wheel 2, the corresponding angle $\pi$ of wheel 2 may be mathematically and geometrically computed. The difference in angular positions of the inside and outside wheels, called the "rotation difference" is in the last column of Fig. 18 and is computed for values of $\gamma$ which are a multiple of 5°.

Figure 18:
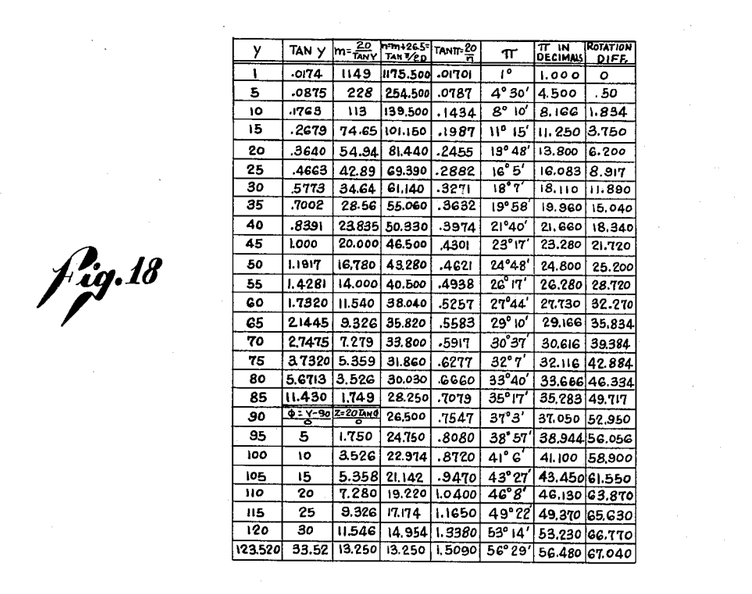

Having now determined as indicated on Fig. 18, the rotation difference, or to express it in another way, the difference in the angular positions of the inside and outside wheels for any given angle of the inside wheels, it follows that this difference for that given angle must correspond to a definite position for the outside wheels and also to a definite position of the control gear and that all of these angular positions must correspond to a certain fore and aft position in plan view of the control gear and the steering shaft upon which the control gear is mounted. This position is expressed by the ordinant values in Fig. 16 as the distance in inches from the horizontal base line of the graph, which represents the normal or initial position of the control gear and steering shaft. This position of the control gear from its initial position is also designated by the letter $d$ on Fig. 14. And as has been heretofore pointed out, the translative movement of the control gear is brought about by the interaction of the cam lobes with the cam followers.

Figure 16:
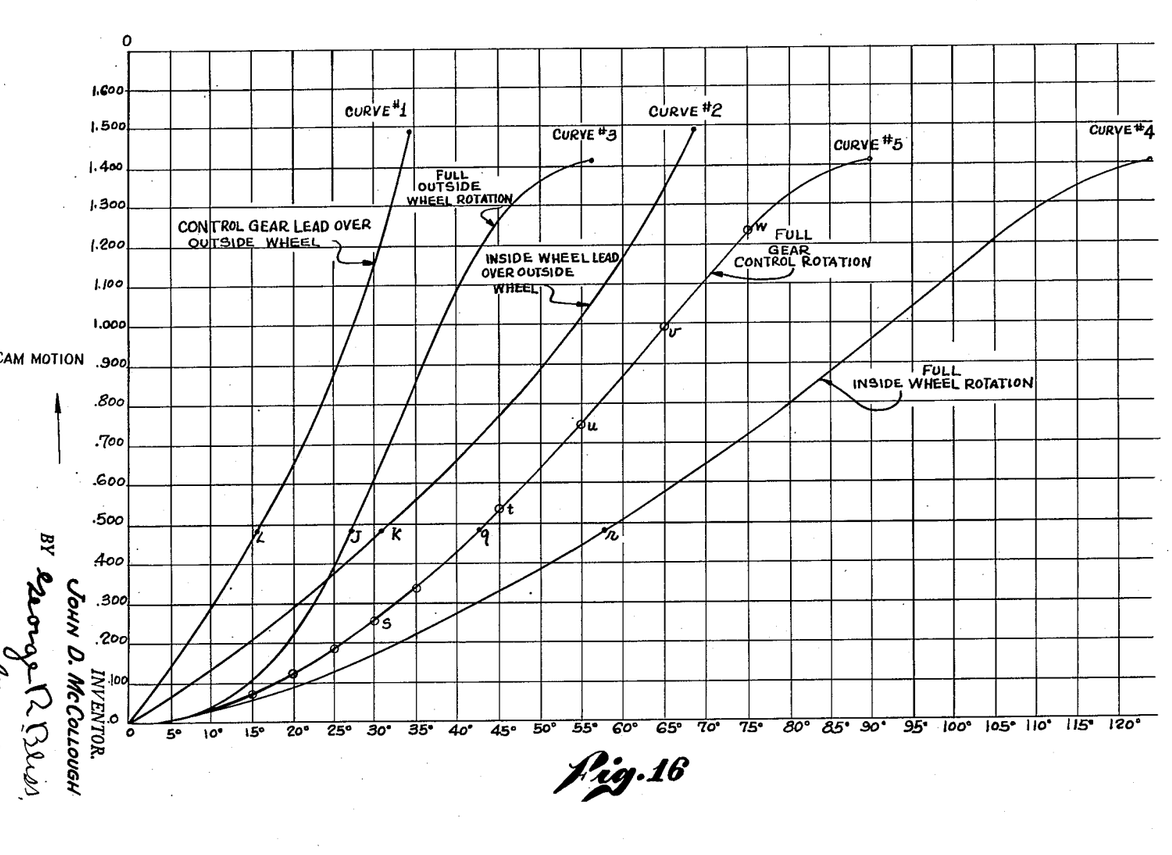

Curve 3, curve 4 and curve 5 on graph of Fig. 16 show the angles of the steering rotation respectively of the outside wheels, the inside wheels, and the control gear for any given translative position of the control gear. The points on these curves are plotted as follows. Curve 2 is a graph of the inside wheel lead over the outside wheel due to linkage motion only, and therefore is a graph of the column "rotation difference" on Fig. 18. Thus curve 2 affords a means for determining the value of $d$ for each rotation difference value. Thus if the rotation difference is 32.270, the distance $d$ is slightly less than .5″ as shown at K on Fig. 16 graph.

Since the value of $\pi$ at this distance $d$ is 27.73 and since $\pi$ designates the angle of steering rotation of the outside wheel, a point *j* is located on curve 3. If now the distance from the point *o* on the lefthand vertical zero line of the graph to the point *k* (representing the rotational difference of the inside and outside wheels at this juncture) is measured off to the right from the point *j*, we fix a new point *r* which determines the angle of steering rotation of the inside wheel and is therefore a point on curve 4. If we then lay off the distance *o*–L rightward from the point *j* we fix a point *v* on curve 5 which is the advance in linear units and the rotational angle of the cam gear for any pair of angles of the inside and outside steering wheels. From this curve is taken directly the cam profile design data at intervals of 5° rotation of the control gear, as for instance at points *s, t, u, v* and *w*.

In the operation of the dolly, if the transmission is set for differential steering to move the dolly in such a path that all points of the dolly move around a common central point on the transverse axis of the dolly, the shift rod 77 is in its lower position with its cross handle 78 so angularly positioned that the lobe 98 (see Fig. 7) is disposed in the notch 94 in the ring 93. The lobe rests upon the horizontal surface of the notch 94 and is prevented from upward movement by contact with the undersurface of the notch 97. The clutch jaws 105 and 106 (see Fig. 3) are in engagement. Therefore rotary movement of the shaft 46 is imparted to the cam 102. The cam is free to rotate with the shaft and thereby to effect a rearward motion of the shaft because the locking finger 107 in this position of the shifting rod 77, is disengaged from the notch 120 in the barrier plate 108.

It will be noted that the shaft 46 must "walk" back and forth whenever the shaft is turned when the clutch jaws 105 and 106 are engaged and that such engagement can only be effected when the locking finger 107 is in vertical registry with the notch 120. This prevents the operator from accidentally or otherwise interrupting the differential steering by shifting rod 77 at any juncture at which the four wheels are not parallel with each other, and from consequent jamming of the wheels. With this adjustment of the transmission, the center of the dolly will turn on a radius of a definite length for each angular position of the steering shaft 46.

With the steering handle 47 in its initial position, usually a position transverse of the dolly, the wheels are parallel with each other and the dolly will move in a straight line parallel to its longitudinal axis. If the handle 47 is moved clockwise to a position at an angle to its initial position, the dolly will move about a point to the left of the dolly as seen in Fig. 1. This turning center will move towards the center of the dolly as the handle 47 is rotated further and further in a clockwise direction. The transmission is so designed that when the handle 47 is perpendicular to its initial position, i. e., parallel to the longitudinal axis of the dolly, the turning point is at the center point 126 of the dolly. If the handle 47 is rotated in a counterclockwise direction, it is apparent that the center of turning of the dolly will be at its right hand as seen in Fig. 1.

If now it is desired to move the dolly in a translative manner, that is, a manner in which all points of the dolly move in straight lines parallel to one another and the wheels are first brought into parallel relationship, the shifting rod 77 is given a 90° turn in a counterclockwise direction moving the lobe 98 to the end of the clutch 94 and in vertical registry with the adjacent end of the notch 97. The shift rod 77 is then elevated, moving the lobe 98 to the level of the notch 97. The shift rod 77 is then given another quarter turn in a counterclockwise direction. The lobe 98 then rests on the upper surface of the ring 93 and is thereby locked against downward movement. As has been explained above this shifting of the rod 77 may only be accomplished when the shaft 46 is in its forward position and in its initial rotative position. In other words it can only be effected when the four wheels of the dolly are parallel to each other.

The locking finger 107 and the barrier plate 108, notched at 120, will prevent a shift from the differential position to the parallel position of the wheel at any other juncture than when the steering shaft is in its initial position with the four wheels parallel to each other.

In the adjustment of the transmission for translative movement, when the steering shaft is in its initial position with the steering handle directed transversely of the dolly, the dolly will travel backward and forward in the direction of its longitudinal axis. For other positions of the steering handle, the four wheels wil be turned to new parallel positions respectively in which the dolly will travel in straight lines at corresponding angles to its longitudinal axis.

As can be seen from an inspection of Fig. 10, the wheels 4 and 5 are steeringly rotated through the angles equal to those of wheels 2 and 3 respectively but in the opposite direction of rotation when the design is such as to turn the dolly around a center which travels along the transverse axis 128—128 of the dolly as a locus. While the principle of the invention can be used in the design of a transmission to properly steer the wheels for turning the dolly about a center traveling along any other line across the dolly as a center locus, the locus line 128—128 presents the simplest design problem and gives the dolly practical maneuverability. If, however, the locus line is moved forward to the line 161—161 of Fig. 13, we have another condition which however poses a fairly simple design problem and provides a dolly product which is capable of practical and useful maneuvers.

Fig. 8 shows the manner in which this problem may be met. The upper bevel gear 36, shown in Fig. 5, is omitted and locking jaws 120, 121 are provided on the bevel gear 37' and boss 22' respectively which lock the shaft 19' against rotation when the transmission shift rod is in its lower position, i. e., the position for differential transmission. The wheels 4 and 5 shown in Fig. 13 will then be held parallel to the longitudinal axis of the dolly and will properly center the dolly in its rotation about any point 160 along the axis of rolling rotation 161—161 of the dolly wheels 4 and 5. The cam moving the steering shaft fore and aft will be, of course, designed to center the wheels 2 and 3 on points along line 161—161.

When the transmission shift rod 77 is in its upper position, i. e., the position for translative movement of the dolly, the wheels 4 and 5 of Fig. 13 will steeringly turn through angles of equal value, and a value equal to that of the rear wheels 2 and 3. For in this position of the shift rod 77, the bevel gears 27' on each side of the transmission are unlocked for rotation and the bevel gears 35' rotate them in the same rotational direction as the rear wheel drive shafts 17 and 18. And the drive shafts in this stationary initial position of the steering shaft 46, are rotated through steering rotational angles which are equal at any and all positions of the steering shaft.

While the invention is shown and described herein in connection with a four wheel hand propelled truck or dolly, the invention may be also used in the design of a motor drive vehicle, and may be adapted to dollies and similar vehicles having three wheels or five or more wheels. Thus, referring to Fig. 10, if the wheels 4 and 5 are replaced by a single wheel 45a (shown in phantom) it can be given a controlled steering rotation at the same rate as that of the control gear by any suitable type of transmission. Its angular deviation from the straight ahead normal position would then be of value intermediate those of wheels 2 and 3.

Or, referring to Fig. 13, the third wheel 45b shown in phantom may be connected to a sprocket wheel on a shaft corresponding to either of the shafts 19 and 20, and the arrangement of gearing shown in Fig. 8 may be used to lock this third wheel in its initial position to properly turn about the point 160, on the transverse axis line of the vehicle passing through this third wheel, when the transmission is in the differential drive position, and to turn this third wheel in parallelism with the two wheels 2 and 3, when the transmission is in the position for translative movement of the dolly.

While the invention has been described as embodied in a dolly for use in mounting a television or motion picture camera, it is obvious that the invention has use in other fields, such as dolly trucks for moving goods about warehouses. In fact, it can be used whenever it is desired to so move objects having laterally extended surfaces such as the dolly wheels from an initial parallel position in which axes passing perpendicularly through their centers are coincident to other positions in which these axes are separated but are in the same plane and meet at points along a locus line perpendicular to the plane or planes of the extended surfaces of the objects in their initial parallel position. In the field of optics, this transmission may be used to direct rays of light from two or more moving lenses or mirrors to a focal point which moves along a desired travel path.

What is claimed is:

1. In a wheeled vehicle, the combination of: a load supporting structure; a plurality of supporting rotatable rolling wheels on the structure, at least two of which are castered and are symmetrically related to one axis of the structure; a reversibly movable steering means for the wheels; a first gear wheel rotatively driven by the steering means; two second gear wheels associated with the two caster wheels respectively and connected to steeringly rotate their associated wheels on vertical caster axes at a constant speed ratio respectively; intermediate third gear wheels each engaging the first gear wheel and an associated one of the second gear wheels respectively, the first gear wheel being movable translatively of its axis while in operative engagement with the third gear wheels in a path directed between the second gear wheels; and the third gear wheels being free to move translatively of their axis while in engagement with both the first gear wheel and their respectively associated second gear wheels; and means for effecting the translative movement of the first gear wheel concurrently and commensurately with the steering rotation thereof.

2. In a differential transmission: a driving wheel; two driven wheels mounted on mutually parallel axes; two intermediate power transmitting wheels engaging the driving wheel on the one hand for receiving power and the two driven wheels respectively on the other hand for transmitting power, the driving wheel being mounted for rectilinear axially translative movement perpendicularly toward and from an imaginary line perpendicularly connecting the axes of the driven wheels, and the two intermediate wheels being axially linked to the driving wheel for arcuate axially translative movement about the center of the driving wheel and being axially linked to the driven wheels respectively for simultaneous arcuate axially translative movement about the centers of the two driven wheels respectively in epicyclic fashion; and optionally effective means converting angular movement of the driving wheel about its axis into axially translative movement thereof, in accordance with a predetermined pattern of relationship of angular values of said angular movement to linear values of said translative movement.

3. The subject matter defined in claim 2 in which the means for said conversion of rotary movement to translative movement is a circumferentially disposed cam means between the driving wheel and its mounts constructed with a contour designed to rectilinearly translatively move the driving wheel in such progressive patterned relationship to its rotation that the driven wheels are rotated simultaneously over arcs of mutually different and progressively changing values so related that two imaginary radial lines of the two driven wheels respectively which are identically directed in an initial normal rotational and translative position of the driving wheel, at all times intersect each other on a fixed rectilinear locus line parallel to and spaced from the imaginary line connecting the centers of the driven wheels.

4. In a differential steering device, the combination of: a frame structure movably supported on steerable roller wheels, at least two of which are juxtaposed symmetrically on opposite sides of said structure; a steering shaft; a support upon which the shaft is mounted for rotation on its axis and which is in turn mounted on the structure for rectilinear movement along a longitudinal line perpendicular to the shaft axis; a driving gear wheel fixed on the shaft; two driven gear wheels mounted on the structure in axially fixed position with their axes parallel to the axis of the driving wheel; and two intermediate gear wheels linked to and engaging the driving gear wheel on the one hand, and linked to and engaging the driven wheels respectively on the other hand, said intermediate gear wheels being symmetrically related to the said longitudinal line with their axes parallel to the driving gear wheel axis, cam and follower means of which one is mounted on the structure and the other is fixed on the shaft, the cam having a contour designed to propel the shaft support and shaft to and fro along said longitudinal line between fixed limits upon rotation of the shaft; and driving means connecting the driven gear wheels and the said juxtaposed steerable roller wheels respectively for transmitting a steering movement to said two roller wheels, whereby the angular degree of rotation of the intermediate gear wheels on their axes imparted to them by the rotation of the steering shaft over a given angular degree of rotation of the said steering shaft, varies differentially with respect to each other in accordance with, and as determined by, the position of the shaft support along said longitudinal line.

5. The combination defined in claim 4 in which the axes of the intermediate gear wheels and of the driven gear wheels are in a single plane when the shaft is in its said initial limit position in which it is most remote from said plane.

6. The combination defined in claim 4 in which the cam contour is so designed that the linear travel of the shaft support is so correlated with the angular travel of the shaft on its axis that the resultant angular travel of the two driven gear wheels is so differentially related that diametral lines of said driven wheels which are identically directed at the initial limit position of the rectilinear movement of the shaft, intersect at a point which travels from infinity to said longitudinal line along a rectilinear locus line perpendicular to said longitudinal line.

7. The combination defined in claim 6 in which the cam is rotatable on the shaft and in addition thereto an optionally disengageable clutch is located between the shaft and cam; and means simultaneously operable with the disengagement of said clutch for locking the cam to the structure against rotation.

8. The combination of claim 7, in which the clutch comprises a clutch collar splined on the shaft, the clutch collar and cam each having clutch jaws engageable with the jaws of the other upon relative movement thereof axially of the shaft, and manually operable means on the frame structure for moving said clutch collar axially along the shaft for engaging and disengaging said jaws, and in which said locking means comprises a finger on said manually operable means which projects toward the shaft axis, and a barrier plate on the cam contoured like the cam and parallel thereto, said plate being notched to register axially of the shaft with the said finger and be thereby disposed for rotational locking engagement therewith only when the shaft is in its more remote limit position and at that juncture only to permit axial shifting of the clutch collar to disengaged position.

9. In a wheeled vehicle, the combination of: a load supporting structure; a pair of front caster wheels and a pair of rear caster wheels supporting said structure; two front control wheels and two rear control wheels for said caster wheels respectively each being fixedly mounted on said structure axially parallel to the other control wheels and connected to its associated caster wheel to reproduce a steering rotation of the caster wheel of identical arcuate character to its own rotation about its axis; two reversible transmissions each connecting a front and rear control wheel respectively; a steering shaft mounted on the structure for limited rectilinear movement perpendicular to its axis and in a plane parallel to and equidistant from the axes of one of said pairs of front control wheels and rear control wheels; a master control driving wheel fixedly mounted on said shaft; a transmission permanently connecting said master control wheel and said one of said pairs of front control wheels and rear control wheels, comprising a pair of intermediate power transmitting wheels, each linked to and rotatively drivingly engaging with the master control wheel on the one hand and an associated one of the said pair of control wheels on the other hand, whereby said intermediate wheels are capable of symmetrical epicyclic movement about the axes of the control wheels upon said movement of the steering shaft to and fro in said plane; cam means disposed between the shaft and structure for converting rotary movement of the shaft into rectilinear movement of the shaft in said plane; a clutch for engaging and disengaging said cam means; and a two-position control lever connected when in one position to shift said cam means clutch to its operative position when the steering shaft is in its limit position in said plane more remote from said pair of control wheels and simultaneously shift both said reversible transmissions to connect said front and rear control wheels for rotation in opposite directions, and to, when in the other position, shift said cam means to its inoperative position and simultaneously shift both said reversible transmissions to connect said front and rear control wheels for rotation in the same direction.

10. The combination defined in claim 9, in which the said lever in each of its said positions, is locked against shifting to its other position, and is manually additionally shiftable to unlock it for the shift to its other position.

11. The combination defined in claim 10, in which the said lever is a rod longitudinally shiftable between its two positions, and rotatably shiftable in both rotative directions in either of its said two positions to lock and unlock it respectively.

12. The combination defined in claim 9, and in addition thereto means blocking the shifting of said cam means clutch by said lever from its operative to its inoperative position when the steering shaft is displaced from its limit position more remote from said pair of control wheels; and means blocking the shifting of said cam means clutch by said lever from its operative to its inoperative position when the steering shaft is rotatively displaced and said cam means is disengaged.

13. The combination defined in claim 9 in which the cam means has that specific contour which will so relate the rectilinear travel of the shaft with its angular travel that the resultant angular travel of said one of said pairs of control wheels and the resultant angular steering travel of the caster wheels associated therewith is so differentially related that the axes of the caster wheels intersect at a point on a locus line in the plane of, parallel to, and equidistant from the transverse axes of the structure through the front and rear caster wheels respectively, at any angular position of the steering shaft.

14. In a wheeled vehicle, the combination of: a load supporting structure; a pair of front caster wheels and a pair of rear caster wheels supporting said structure; two front control wheels and two rear control wheels for said caster wheels respectively each being fixedly mounted on said structure axially parallel to the other control wheels and connected to its associated caster wheel to reproduce a steering rotation of the caster wheel of identical character to its own rotation about its axis, two disengageable transmissions, each connecting a front and rear control wheel for rotation in the same direction; a steering shaft mounted on the structure for limited rectilinear movement perpendicular to its axis in a plane parallel to and equidistant from the axes of one of said pairs of front control wheels and rear control wheels; a master control driving wheel fixedly mounted on said shaft; a transmission permanently connecting said master control wheel and said one of said pairs of front control wheels and rear control wheels, comprising a pair of intermediate power transmitting wheels, each linked to and rotatively drivingly engaging with the master control wheel on the one hand and the associated one of said pair of control wheels on the other hand, whereby said intermediate wheels are capable of symmetrical epicyclic movement about the axes of the control wheels upon said movement of the steering shaft to and fro in said plane; cam means disposed between the shaft and structure for converting rotary movement of the shaft into rectilinear movement of the shaft in said plane, the cam means being of that specific contour which will cause a differential steering rotation of the two wheels of said one of said pairs of control wheels such that for any angular position of the steering shaft the axes of the two caster wheels associated with said pair of control wheels will intersect on a locus line which is the transverse axis of the structure through the other pair of caster wheels; a clutch for engaging and disengaging said cam means; and a two position control lever connected to, when in one position, shift said cam means clutch to its operative position when the steering shaft is in its limit position more remote from said pair of control wheels and simultaneously disengage said two disengageable transmissions, and to when in the other position shift said cam means clutch to its inoperative position and simultaneously engage said disengageable transmissions; and means for automatically locking said other pair of control wheels in position parallel to the longitudinal axis of the structure upon shifting of said two position lever to said first mentioned position.

15. In a wheeled vehicle, the combination of: a load supporting structure; a pair of caster wheels supporting one end of the structure; a single central caster wheel supporting the other end of the structure; a pair of control wheels for said pair of caster wheels respectively, each being fixedly mounted on said structure axially parallel to each other and connected to its associated caster wheel to reproduce a steering rotation of the caster wheel of identical character to its own rotation about its axis; a steering shaft mounted on the structure for limited rectilinear movement perpendicular to its axis in a plane parallel to and equidistant from the axes of said pair of control wheels; a master control driving wheel fixedly mounted on said shaft; a transmission permanently connecting said master control wheel and said pair of control wheels, comprising a pair of intermediate power transmitting wheels, each linked to and rotatively drivingly engaging with the master control wheel on the one hand and the associated one of said pair of control wheels on the other hand, whereby said intermediate wheels are capable of symmetrical epicyclic movement about the axes of the control wheels upon said movement of the steering shaft to and fro in said plane; cam means disposed between the shaft and structure for converting rotary movement of the shaft into rectilinear movement of the shaft in said plane, the cam means being of that specific contour which will cause a differential steering rotation of the two wheels of said pair of control wheels such that for any angular position of the steering shaft the axes of the two caster wheels associated with said pair of control wheels will intersect on a locus line which is the median transverse axis of the structure; a clutch for engaging and disengaging said cam means; a power transmission from the master control wheel to said single caster wheel connected for controlling the steering movement of the single caster wheel; and a two position control lever connected to, when in one position, shift said cam means clutch to its operative position when the steering shaft is in its limit position more remote from said pair of control wheels, and to, when in the other position, shift said cam means clutch to its inoperative position.

16. The combination defined in claim 15 in which said connections between said caster wheels and pair of control wheels respectively, are reversible by the operation of the said clutch, and in addition thereto a power transmission from the master control wheel to said single caster wheel connected for reproducing a steering rotation of said single wheel of identical angular degree and direction with the rotation of the master control wheel.

References Cited in the file of this patent

UNITED STATES PATENTS

| | | |
|---|---|---|
| 1,681,893 | Barshell | Aug. 21, 1928 |
| 2,366,122 | Merce | Dec. 26, 1944 |
| 2,423,266 | Stokes | July 1, 1947 |
| 2,470,496 | Krilanovich | May 17, 1949 |

FOREIGN PATENTS

| | | |
|---|---|---|
| 451,813 | Great Britain | Aug. 12, 1936 |
| 580,422 | Great Britain | Sept. 6, 1946 |